United States Patent [19]
Östling

[11] Patent Number: 4,978,236
[45] Date of Patent: Dec. 18, 1990

[54] DEVICE FOR MOUNTING A BEARING ON A SHAFT MEMBER OR THE LIKE

[75] Inventor: Sture Östling, Katrineholm, Sweden

[73] Assignee: SKF Mekanprodukter AB, Katrineholm, Sweden

[21] Appl. No.: 489,512

[22] Filed: Mar. 7, 1990

[30] Foreign Application Priority Data

Mar. 17, 1989 [SE] Sweden ................................. 8900952

[51] Int. Cl.⁵ .............................................. F16C 33/80
[52] U.S. Cl. ...................................... 384/480; 384/583
[58] Field of Search ............... 384/480, 583, 585, 903, 384/144, 538, 626

[56] References Cited

U.S. PATENT DOCUMENTS

| | | | |
|---|---|---|---|
| 4,093,324 | 6/1978 | Carrigan | 384/480 |
| 4,527,915 | 7/1985 | Ikariishi et al. | 384/480 |
| 4,613,240 | 9/1986 | Hagelthorn | 384/583 |
| 4,697,937 | 10/1987 | Karlsson | 384/585 |

Primary Examiner—Lenard A. Footland
Attorney, Agent, or Firm—Eugene E. Renz, Jr.

[57] ABSTRACT

A bearing housing (3) supports a bearing (2) for a shaft (1). The bearing is mounted on the shaft with a clamping sleeve (4) on which are provided two flanges (5, 6) on opposite sides of the bearing. The flanges form part of mounting and dismounting means for the bearing. Sealing members (12, 13) are provided between the flanges (5, 6) and the housing (3) radially outside the flanges. Means (7) are provided for displacement of the bearing (2) axially on the clamping sleeve (4) when mounting and dismounting the bearing. One of the sealing members (12) is arranged to axially bridge a slot (10) between the flange (5) and a washer (8) associated with the bearing (2).

7 Claims, 2 Drawing Sheets

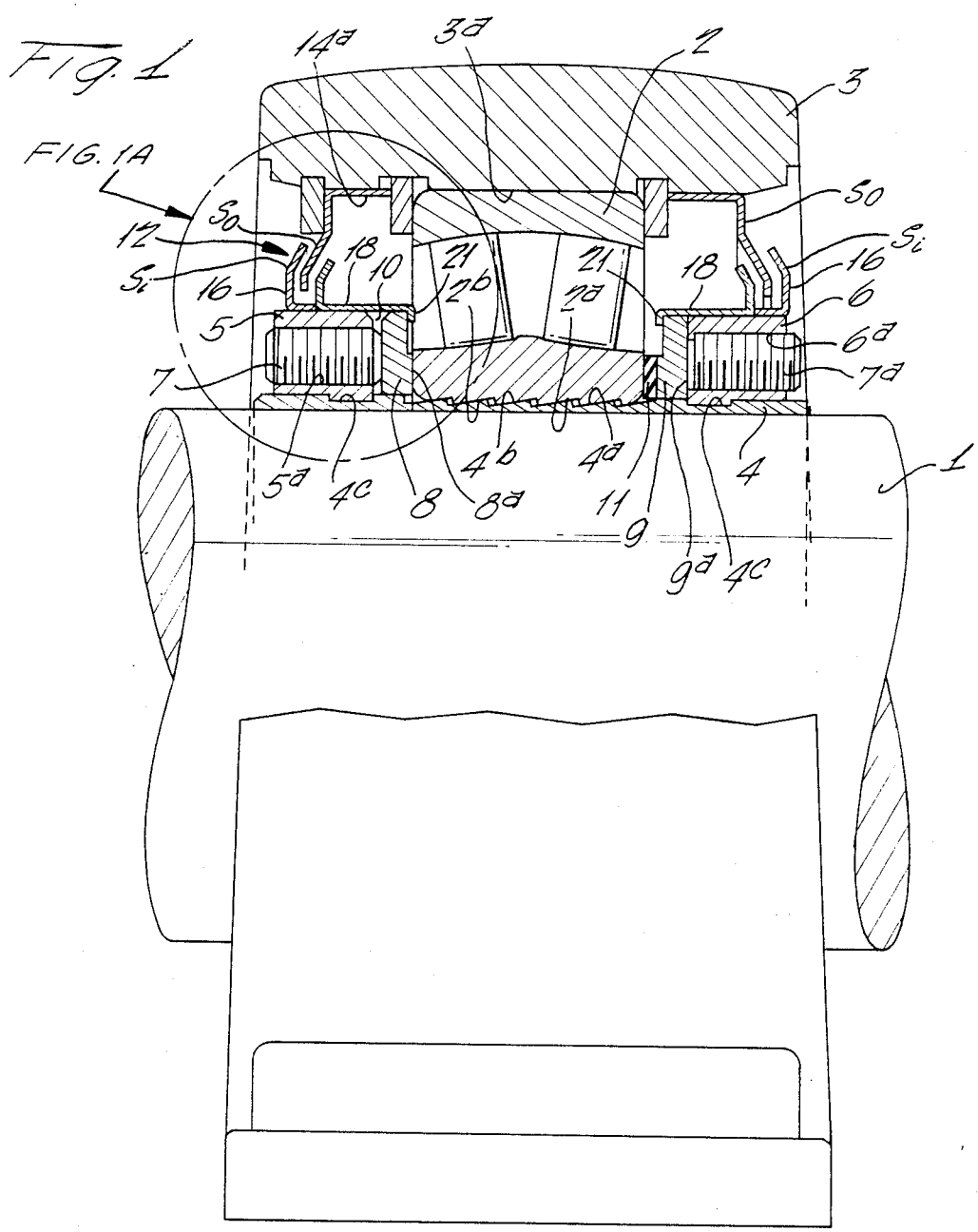
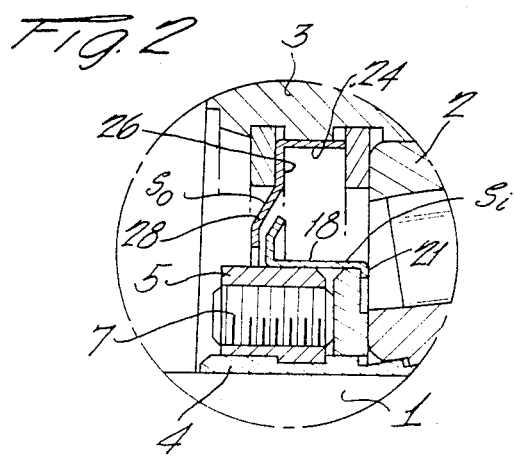
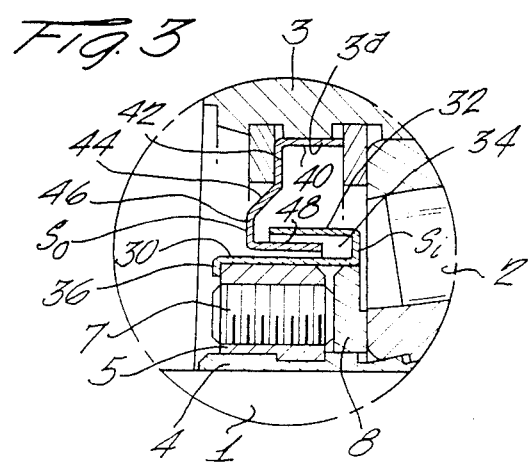

DEVICE FOR MOUNTING A BEARING ON A SHAFT MEMBER OR THE LIKE

FIELD OF THE INVENTION

The present invention relates to a device for mounting a bearing on a shaft member or the like.

BACKGROUND OF THE INVENTION

Mounting devices of the type to which the present invention relate typically comprise a clamping sleeve located between the bearing and the shaft and a flange located at least on one side of the bearing. A seal is provided between the flange and the housing radially outwardly of the flange and means is provided for displacement of the bearing axially on the sleeve during mounting and dismounting of the bearing so that the width of a slot appearing between the flange and the bearing or a washer associated therewith is altered during axial displacement of the bearing. A device of this general type is shown in Swedish application Ser. No. 450851. In this prior arrangement, the sealing member consists of a sealing lip which is designed to engage the radially outer surface of the flange. However, it has been found that the use of this type of the sealing lip limits the field of use to applications wherein the shaft rotates at a relatively low speed.

SUMMARY OF THE INVENTION

With the foregoing in mind, an object of the present invention is to provide a device of this general type which is particularly adapted for use in high-speed applications. To this end in accordance with the present invention, the seal comprises a first sealing element associated with the flange or washer and a second sealing element cooperating with the first sealing element and associated with the housing in a predetermined manner and preferably fixedly connected to the housing wherein the first sealing element extends axially across the slot and thereby bridges the slot.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a longitudinal section through the principle embodiment of a mounting device constructed in accordance with the present invention; FIGS. 2 and 3 are view similar to FIG. 1 of modified embodiments of the present invention.

DETAILED DESCRIPTION OF THE PREFERRED EMBODIMENT

Figure 1A:
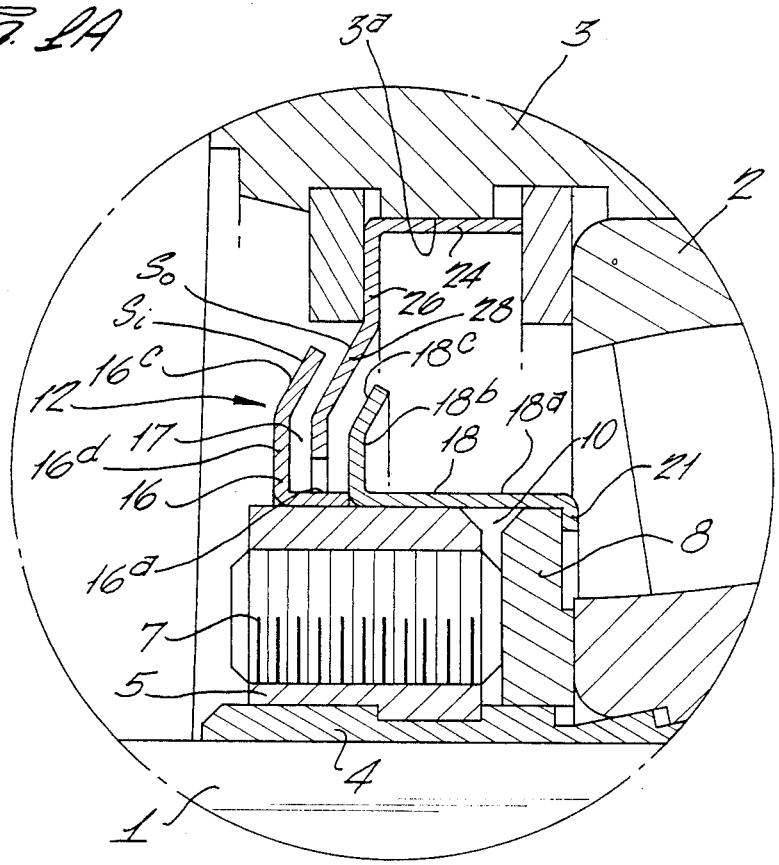
FIG. 1a is an enlarged view of the portion circled in FIG. 1.

Referring now to the drawing and particularly to FIG. 1 thereof, there is shown a typical bearing assembly incorporating a mounting device in accordance with the present invention. As illustrated therein the assembly comprises a shaft 1 supported in a housing 3 on a bearing 2. In the present instance, the bearing is a double row spherical roller bearing and is mounted in a cylindrical seat 3a in the housing 3 and is secured to the shaft via a clamping sleeve 4. Sleeve 4 is slotted along its entire length so that is can be radially deformed to a maximum extent. The bore 2a of the inner bearing race ring and the outer peripheral surface 4a of the clamping sleeve 4 are designed with complementary cooperating clamping surfaces 2b and 4b which as illustrated are wedge shaped in longitudinal section. In the embodiments illustrated, the longitudinal sections of the surfaces 2b and 4b have a sawtooth profile whereby the clamping surfaces have a relatively short radial extension. The bearing may be mounted and dismounted by simply displacing the bearing and clamping sleeve axially relative to one another. To this end, the clamping sleeve 4 is provided with flanges 5 and 6 disposed on both sides of the bearing which are axially secured to the sleeve and equipped with threaded bores 5a and 6a to receive set screws 7 for direct or indirect engagement against the end surfaces of the inner race ring of the bearing 2. When the screws are tightened in the bores in the flange 5, the bearing by a wedging action is clamped against the shaft between the bearing and the clamping sleeve. To dismount, the screws 7 in ring 5 are loosened and the screws 7a are tightened in the bores 6a in the flange 6 whereby the bearing is pushed back along the sleeve 4 and the clamping force is relieved. The flanges 5 and 6 are preferably separate elements loosely fitted in grooves 4c in the sleeve 4 and in this way facilitate restricting the radially compressibility of the sleeve. The diameter of the sleeve 4 may vary in the areas enclosed by the flanges. A loose washer 8 is preferably located between the bearing 2 and the flange 5 having end surfaces 8a formed to provide an appropriate sealing engagement against the inner race ring of the bearing 2 or for absorbing forces from set screws in the bores in the flange 5.

A second washer 9 is provided between the flange and the bearing at the opposite end of the sleeve 4. The end surfaces 9a of the second washer 9 engage the dismounting screws 7a in the flange 6 and a second sealing and resilient member 11 located between the washer 9 and the axially end surface of the inner race ring of the bearing 2. The resilient member 11 is compressible and in this way, the inner race ring of the bearing can be displaced axially during mounting on the clamping sleeve 4. The resilient member 11 also acts as a seal between the washer 9 and the bearing. The contact between the washer 9 and the flange is tight. A slot may occur between the flange and the washer only during dismounting of the bearing.

The width of the slot 10 between the flange 5 and the washer 8 will vary when mounting and dismounting the bearing due to the axial displacement of the bearing during mounting and dismounting of the bearing. In accordance with the present invention, the sealing member 12 located radially outside the flange 5 between the flange and the housing is adapted to bridge the slot 10. Thus, it is possible that by this arrangement the axial displacement of the bearing can be effected without losing the sealing function.

In the embodiment of the invention illustrated in FIG. 1, the seal 12 is designed as a labyrinth seal having a first inner sealing member $S_i$ mounted on the flange 5 and a second outer sealing $S_o$ mounted in the bore 3a of the outer ring 3. The inner sealing member $S_i$ bridges the slot 10 and accordingly any impurities entering through the slot in the sleeve 4 and spreading in the slot between the flange 5 and the washer 8 are prevented from penetrating into the bearing by the sealing member $S_i$. In the same manner, the sealing member $S_i$ prevents lubricant from escaping from the bearing along the same path. As illustrated in the various embodiments, the sealing member $S_i$ is arranged to engage the radially outer surfaces of the flange 5 in the washer 8.

Considering now more specifically the illustration in FIG. 1, the sealing member $S_i$ is securely connected to the washer 8 by means of a radially inwardly directed short flange circumferentially extending flange 21 bent radially inward from the main portion 18a. Accordingly, the axial movement caused when mounting and dismounting the bearing 2 results in a relative motion between the flange 5 and the main portion 18a. The labyrinth seal function is maintained by means of two radially projecting sealing portions on the sealing part $5_1$ provided to receive between them a sealing portion of the sealing part 50 which extends radially inwardly and projects into the space.

Considering now more specifically the embodiment of the invention illustrated in FIG. 1, refer to FIG. 1a, the inner sealing member $S_i$ comprises in the embodiment illustrated side by side sealing sections 16 and 18 defining therebetween a generally U-shaped labyrinth channel 17. The section 18 has a generally cylindrical portion 18a overlying and mounted on the outer peripheral surface of the flange 5 and a radially inwardly directed circumferentially extending flange 21 at its inner axial end which engages over and is firmly connected to the washer 8. A radially outwardly directed sealing lip 18b projects radially from the opposite axial end of the cylindrical body portion 18a of the section 18 which terminates in a frusto conical inwardly directed lip section 18c overlying the circumferentially extending section 18a of the seal. The seal section 16 of the inner sealing member $S_i$ is of generally L-shaped configuration having a short cylindrical base section 16a mounted on the outer periphery of the flange 5 abutting the end of the section 18 and having a radially outwardly directed sealing lip 16d terminating in an axially inwardly directed frusto conical section 16c spaced from and generally parallel to the frusto conical lip 18c of the sealing section 18 and defining therebetween the circumferentially extending channel which opens inwardly toward the center of the bearing.

The outer seal $S_o$ includes a generally cylindrical base portion 24 which engages in the bore 3a of the housing 3 having a generally radially inwardly extending circumferentially directed lip 26 at its outer axial end which is of generally Z-shaped cross section including a frusto conical section 28 which project into the channel 17 define between the inner sealing lips and defines the tortuous labyrinthian sealing path.

The embodiment of the invention as illustrated in FIG. 2 is generally similar to that as shown in FIG. 1 except that this embodiment does not include the outer section 16 of the inner seal $S_i$ and is essentially a two piece labyrinthian seal.

In accordance with the embodiment of the invention as illustrated in FIG. 3, the labyrinth seal is a two piece seal wherein the inner seal Si in this instance comprises a rather wide base portion 30 overlying the outer peripheral surface of flange 5 and washer 8 and is reversely bent on itself to define a circumferentially extending axial portion 32 overlying and spaced from the base portion 30 to define an outwardly open channel 34. The base portion 30 has a radially crimped in flange 36 at its outer axial end which mounts it to the flange 5. The outer seal $S_o$ has a rather wide based portion 40 which seats in the bore 3a of the housing 3, a radially extending section 42 projecting inwardly from one axial end of the base portion, and outwardly offset frusto conical section 44 terminating in a short radial section 46 and inwardly axially extending lip 48 which engages in the channel 34 in the inner seal member to provide the labyrinthian path indicated.

Space is saved in axial direction as the seals are provided in the same plane as the flanges 5, 6 and cooperate with these. The seals furthermore do not require any larger radial space than the bearing 2 itself, and therefore there is a requirement for extra radial space in the housing 3. The design of the labyrinth seal allows the flanges 5, 6 to move rather far radially without being hampered by the seals, which means that the shaft 1 may be tilted in the housing 3 as much as admitted by the self-adjusting ability of the bearing 2. The entire device is enclosed by the housing 3, thus that no rotating parts projects outside the housing, which is advantageous from safety viewpoints. The device encloses the bearing quite tightly in the housing although a slotted sleeve is used as a mounting element.

In the embodiment illustrated one portion of the labyrinth seal is fixedly connected either to the washer 8, see FIG. 1 and 2, or to the flange 5, see FIG. 3. Alternatively the washer 8 and the sealing part may of course be designed as an integral unit. No matter which of these two alternative is chosen, the sealing part or the part of the integral unit corresponding to the sealing part is designed with sliding fit relative to the washer 8 or the flange 5, such as shown in FIG. 1–3, or with a clearance for forming a slit seal.

If the invention should be used in applications of low or moderate shaft speeds, it is possible to provide the sealing member belonging to the housing 3 with a lip engaging the other sealing part.

In the embodiments shown there is provided a flange at each side of the bearing. The invention, however, is generally applicable on constructions incorporating only one flange, whereby sufficient support for the bearing on the opposite side thereof is provided in a suitable manner. In the illustrated embodiments there is shown a separate washer 8. This washer may of course be formed integral with the bearing inner race ring if this is found appropriate.

What is claimed is:

1. A device for mounting a bearing (2) on a shaft (1) in a housing (3) comprising a clamping sleeve (4) provided between the bearing and the shaft, a flange (5) located at least on one side of the bearing, sealing means provided between the flange (5) and the housing (3) radially outwardly at the flange (5), and means (7) for displacement of the bearing (2) axially on the sleeve (4) during mounting and dismounting of the bearing, wherein the width of a slot (10) appearing between the flange (5) and the bearing (2) or a washer (8) associated therewith is altered at the axial displacement of the bearing (2), characterized in that the sealing means comprises a first sealing element (16) associated with the flange (5) or the washer (8) and a second sealing element (14) cooperating with the first sealing element (16) and being associated with the housing (3), fixedly connected therewith, said first sealing element (16) extending axially across said slot (10) thereby bridging said slot.

2. A device according to claim 1, wherein the sealing member is designed as a labyrinth seal.

3. A device according to claim 2, wherein the first sealing element (16) is fixedly connected to the flange (5).

4. A device according to claim 2, wherein the first sealing element (16, 16) is fixedly connected to the washer (8).

5. A device according to claim 1, wherein the first sealing element (16) comprises a mainly circular cylindrical main portion (18), which is arranged to engage the radially outer surfaces of the flange (5) and of the washer (8).

6. A device according to claim 1, wherein the clamping sleeve (4) is tapering with a longitudinal slot and flanges (5, 6) are provided at both sides of the bearing (2) and wherein a second sealing member (11, 9) is provided between the bearing (2) and the flange (6) situated at the big end of the tapering part of the sleeve (4), said second sealing member being compressible in the displacement direction of the bearing (2) during mounting of the bearing on the sleeve and being in sealing engagement of the bearing on the sleeve and being in sealing engagement with said last mentioned flange (6) and the bearing (2).

7. A device according to claim 1, wherein the first (16) and second (14) sealing elements are designed with first and second, generally radially extending sealing portions, which are arranged to overlap each other radially.

* * * * *